1,714,750

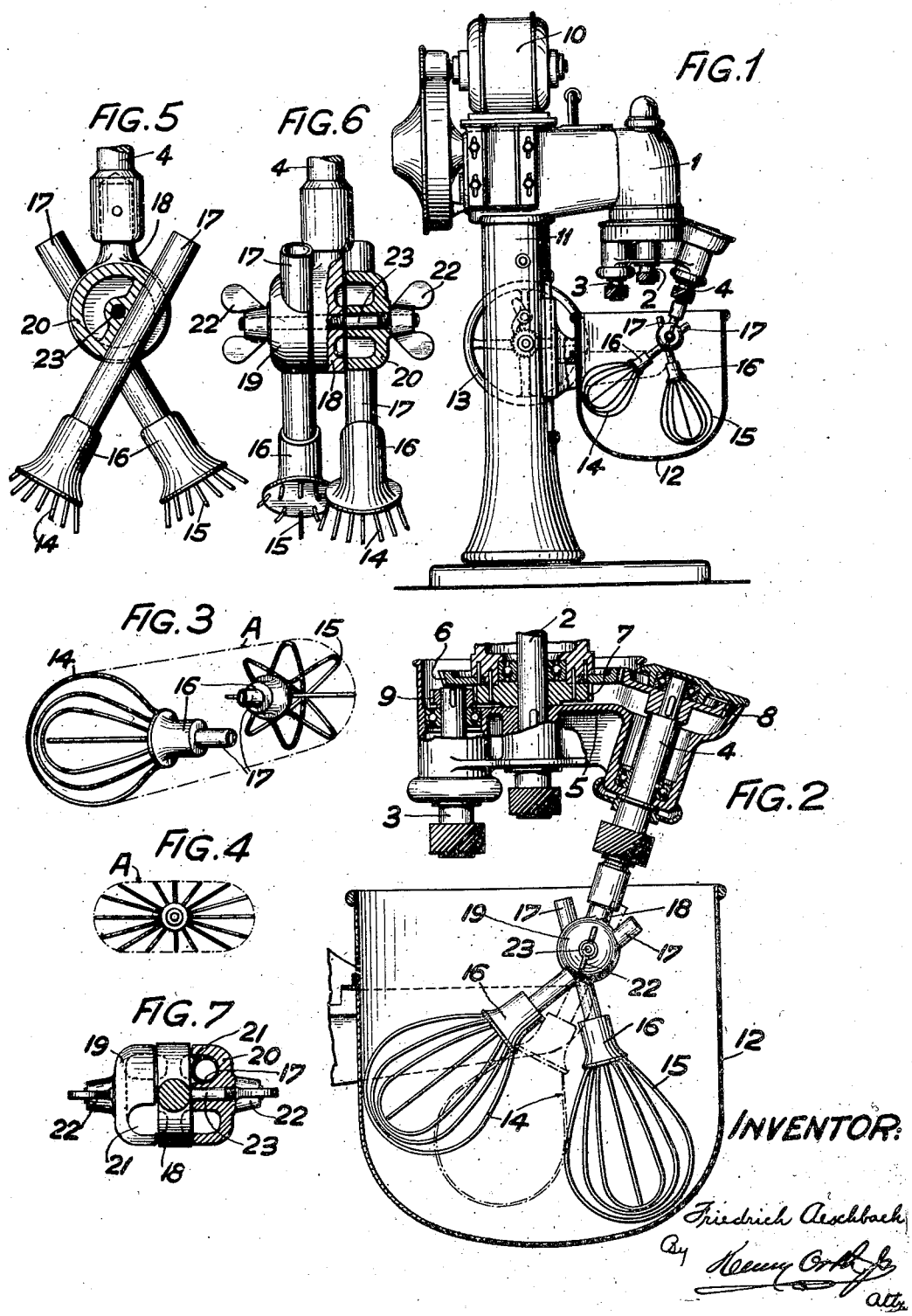
May 28, 1929.  F. AESCHBACH  1,714,750
STIRRING, KNEADING, AND MIXING MACHINE
Filed Aug. 15, 1928
INVENTOR:
Friedrich Aeschbach Patented May 28, 1929.

UNITED STATES PATENT OFFICE.

FRIEDRICH AESCHBACH, OF AARAU, SWITZERLAND.

STIRRING, KNEADING, AND MIXING MACHINE.

Application filed August 15, 1928, Serial No. 299,833, and in Switzerland June 27, 1928.

Stirring, kneading and mixing machines having a working arm provided with a central driving shaft, a driving shaft parallel to the latter and an inclined driving shaft are known, in which the latter two shafts turn about the central shaft and at the same time rotate around their own axes. In machines of this type it is possible to mix, knead and to stir material to be worked without exchanging the trough. If goods are to be stirred in such machines, in any one of these three driving shafts an implement for stirring is inserted i. e. a beater made of wire, all parts of which are arranged symmetrically to the axis of rotation so that the enveloping surface of the implement for stirring represents a body generated by revolution.

Thereby only a stirring effect is attained and by using such a stirring implement for instance for producing whipped cream a comparatively long action by the stirring implement on the material to be worked is required.

Experiments have shown that by properly shaping the stirring implement it can be transformed into an implement for whipping wherewith a considerable increase of stirring effect is attained and the duration of the working action is reduced to one half. The implement for stirring or whipping respectively according to the invention is characterized in that it has an oblong contour when viewed in the direction of the driving shaft and its enveloping surface has a form differing from a body generated by revolution, for the purpose of exerting a whipping action on the material besides the stirring action.

The implement preferably consists of two individual implements, the axes of which are inclined to each other but it might as well be constructed as a single implement of the shape mentioned above.

Constructional examples of the subject matter of the invention are shown in the accompanying drawing, in which:

Fig. 1 shows in elevation a machine for stirring, kneading and mixing,

Fig. 2 shows on a larger scale and in a vertical section the working arm of the machine with the inserted implement for whipping.

Fig. 3 shows the contour of the implement for whipping which consists of two individual tools.

Fig. 4 shows the contour of an implement for whipping consisting of a single unit.

Figs. 5 to 7 are details of the connection of the individual implements.

The machine for stirring, kneading and mixing shown in Figs. 1 is provided with a working arm 1, which has a central driving shaft 2, a driving shaft 3 parallel to the latter and an inclined driving shaft 4. The two shafts 3 and 4 rotate about the central shaft 2 as their bearing support 5 (Fig. 2) rotates in unison with the shaft 2, while the bevel gear wheel 6 and the gear wheel 7 remain stationary; the bevel gear wheel 6 meshes with the bevel gear wheel 8 on the shaft 4 and the gear wheel 9 on the shaft 3 meshes with the gear wheel 7. When the bearing support 5 rotates the wheels 8 and 9 therefore act in the manner of planet gear wheels and besides turning about the central driving shaft 2, the driving shafts 3 and 4 rotate around their own axes. The shaft 2 is driven by an electric motor 10 which is mounted on the standard 11 carrying the arm 1. Below the working arm 1 the trough 12 for receiving the material is placed, which trough is mounted on the standard 11 to be adjustable in height by means of the hand wheel 13.

The implement for stirring or whipping respectively according to Figs. 2 and 3 consists of two individual implements 14 and 15 which in the manner of cream beaters are made of a plurality of wire hoops angularly disposed of each other. The ends of the wires are inserted in holders 16 secured to stems 17. The two stems are held by a head which consists of a central part 18 and two clamping blocks 19 and 20, which are provided with grooves 21 for receiving the stems 17. The clamping blocks 19 and 20 can be pressed against the central part by means of screws provided with wing nuts 22 whereby stems 17 are secured in position. The axes of the two individual implements 14 and 15 are inclined towards each other and this inclination can be varied by displacing the two clamping blocks 19 and 20 angularly to each other for example into the position shown in dots and dashes in Fig. 2.

On account of the fact that the implement for stirring or whipping respectively as shown in Fig. 3 when viewed in the direction of the driving shaft 4 has an oblong contour A and its enveloping surface has a shape differing from a body generated by revolution besides the mere stirring action also a whipping action is attained on the goods to be worked, whereby the efficiency is increased very considerably.

In Fig. 4 an implement for stirring or whipping respectively with a similar contour is shown which consists of a single unit. The implement for stirring or whipping respectively is preferably used in conjunction with the inclined shaft 4 but it may also be inserted in the central shaft 2.

I claim:

1. A stirring, kneading and mixing machine, comprising in combination, a working arm, a central driving shaft, a driving shaft parallel to the same and an inclined driving shaft, said three shafts being mounted in said working arm and the latter two shafts turning about the central shaft and at the same time rotating about their own axes, two individual implements for stirring and whipping respectively, having a combined oblong contour, when viewed in the direction of the driving shaft and constructed each in the manner of a body generated by revolution and provided with a stem, a head secured to the inclined driving shaft, said head having a central part and clamping blocks for fastening the stems of the individual implements to both sides of the central part.

2. A stirring, kneading and mixing machine, comprising in combination, a working arm, a central driving shaft, a driving shaft parallel to the same and an inclined driving shaft, said three shafts being mounted in said working arm and the latter two shafts turning about the central shaft and at the same time rotating about their own axes, two individual implements for stirring and whipping respectively, having a combined oblong contour, when viewed in the direction of the driving shaft and constructed each in the manner of a body generated by revolution and provided with a stem, a head secured to the inclined driving shaft, said head having a central part and clamping blocks for fastening the stems of the individual implements to both sides of the central part and screw means for pressing the clamping blocks on to the central part in different angular positions in order to vary the inclination of the axes of the individual implements towards each other.

3. In a stirring, mixing and kneading machine, two stirring, kneading and mixing implements inclined at an angle to one another and mechanism to impart simultaneous rotation and revolution thereto for operation in the same receptacle.

4. In a stirring, kneading and mixing machine, a receptacle, a diving head thereabove, a central shaft to which said head is secured, and two additional shafts carried by the head, said additional shafts mounted in different relations to the driving shaft, and mechanism between the head and additional shafts to impart simultaneous rotation and revolution to the additional shafts, and means on the end of each shaft for attachment of an implement and operable in the same receptacle.

In testimony whereof I have signed my name to this specification.

FRIEDRICH AESCHBACH.